United States Patent [19]

Orsino et al.

[11] Patent Number: 4,482,618

[45] Date of Patent: Nov. 13, 1984

[54] AIRCRAFT BATTERY

[75] Inventors: Joseph A. Orsino, Diamond Bar; Ernest R. Sawyer, Solano Beach; Ronald J. Hollett, Glendora, all of Calif.

[73] Assignee: Concorde Battery Corporation, West Covina, Calif.

[21] Appl. No.: 493,142

[22] Filed: May 9, 1983

[51] Int. Cl.³ .............................................. H01M 2/28
[52] U.S. Cl. ..................................... 429/179; 429/180
[58] Field of Search ......................... 429/178, 179, 180

[56] References Cited

U.S. PATENT DOCUMENTS

| | | | |
|---|---|---|---|
| 1,151,453 | 8/1915 | Ford et al. | 429/184 |
| 1,942,350 | 1/1934 | Appel et al. | 429/179 |
| 2,052,499 | 8/1936 | Strough | 429/180 |
| 3,457,118 | 7/1969 | Miller | 429/179 |
| 3,703,589 | 11/1972 | Rigsby | 429/160 |
| 4,237,202 | 12/1980 | Karpal | 429/163 |
| 4,337,301 | 6/1982 | Rorer et al. | 429/179 |

FOREIGN PATENT DOCUMENTS

| | | | |
|---|---|---|---|
| 141062 | 10/1980 | Japan | 429/180 |
| 1587541 | 4/1981 | United Kingdom | 429/181 |

*Primary Examiner*—Donald L. Walton
*Attorney, Agent, or Firm*—Keith D. Beecher

[57] ABSTRACT

A lead-acid aircraft battery including an electric terminal assembly for making connections to the internal electrodes of the battery, the terminal assembly being embedded in the plastic cover of the battery and effectively sealed to the cover so as to prevent corrosion by the acid electrolyte in the battery. In a first embodiment the terminal assembly includes a pair of threaded terminal posts which extend outwardly from the cover; and a receptacle; including a corresponding pair of terminal pins respectively threaded coaxially to the posts, is attached to the cover by screws. In a second embodiment an Elcon type receptacle is molded directly into the cover.

6 Claims, 11 Drawing Figures

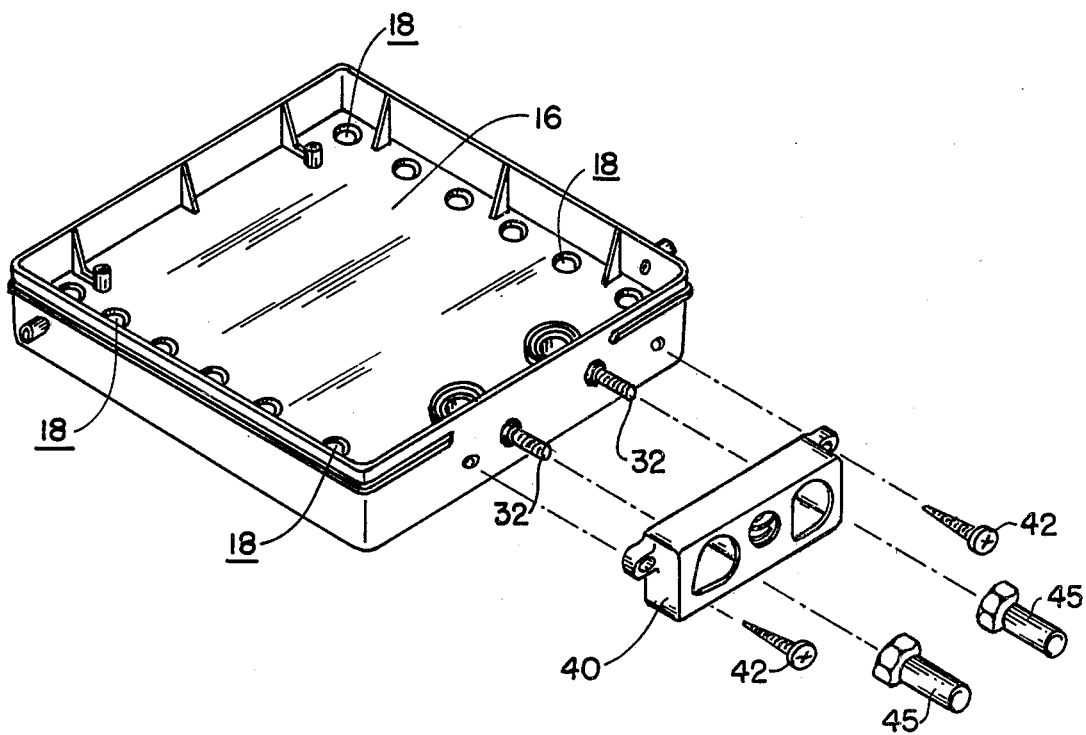
FIG. 1
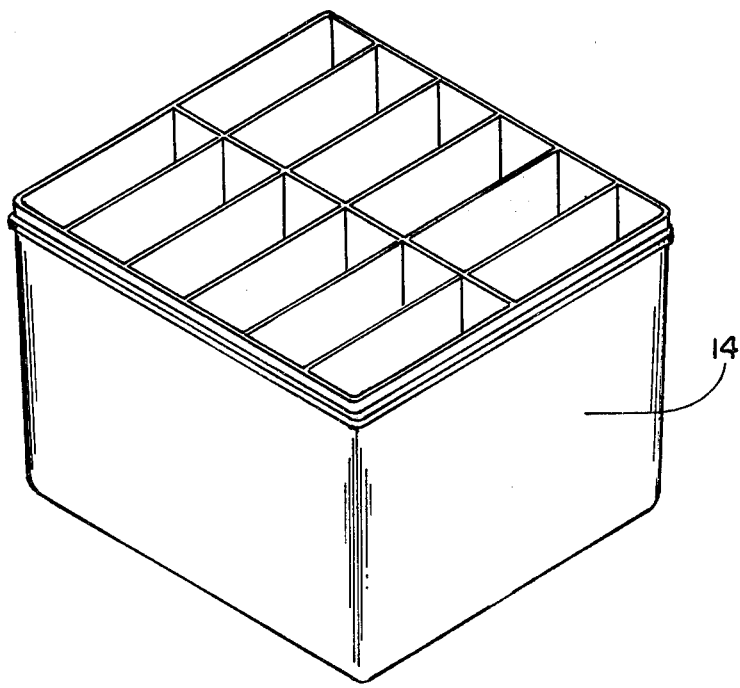

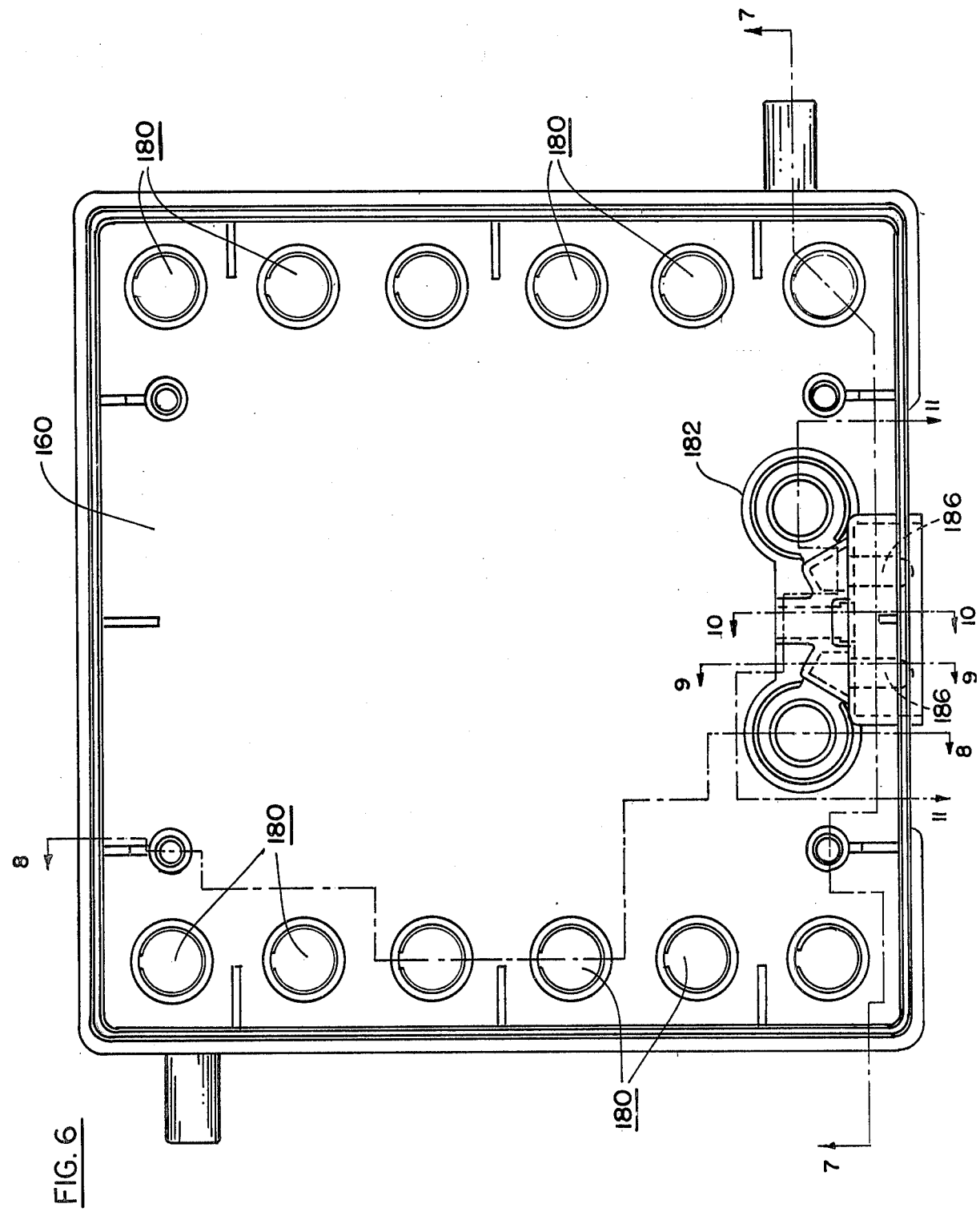

4,482,618

AIRCRAFT BATTERY

BACKGROUND OF THE INVENTION

The lead-acid aircraft battery of the present invention is of the general type which comprises a plastic interior casing formed, for example, of polyethylene, containing interleaved lead and lead-oxide plates immersed in an acid electrolyte, and which includes a plastic cover also formed, for example, of polyethylene which is sealed to the interior casing. A metal external housing composed, for example, of aluminum is provided for the interior casing. The lead and lead-oxide plates within the interior casing are interconnected, and are connected to the embedded terminal assembly of the present invention which includes terminal posts extending through the cover of the interior casing and through the exterior housing.

BRIEF DESCRIPTION OF THE DRAWING

FIG. 1 is an exploded perspective view of an aircraft battery representing a first embodiment of the present invention;

FIG. 5 is a broken-away fragmentary perspective view of a terminal assembly of the battery;

FIG. 6 is a top plan view of a cover, like FIG. 2, but incorporating a second embodiment of the invention.

DETAILED DESCRIPTION OF THE ILLUSTRATED EMBODIMENT

Figure 2:
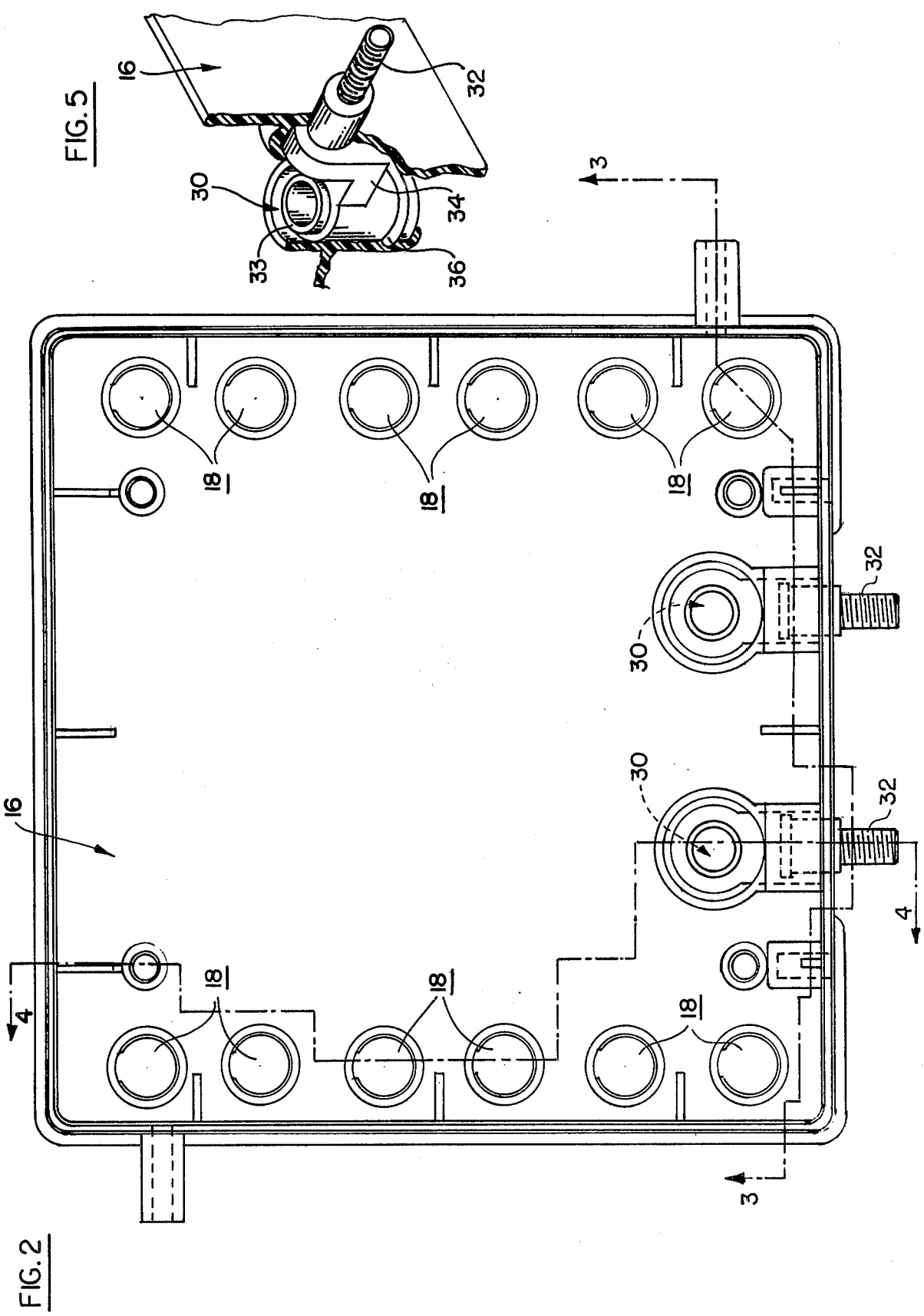
FIG. 2 is a top plan view of the cover of the casing of the battery of FIG. 1.

Referring now to the drawings, and particularly to FIGS. 1–5, there is shown a lead-acid aircraft battery constructed in accordance with a first embodiment of the present invention. The battery, as shown in FIG. 1, comprises a molded plastic casing 14, formed, for example, of polyethylene. Casing 14 has a number of separate cavities, and lead and lead-oxide plates are interleaved in the cavities and are immersed in an appropriate acid electrolyte, in known manner.

The casing 14 is covered by a cover 16 which also may be formed of molded plastic material such as polyethylene. The cover, as also shown in FIGS. 1 and 2, has a number of apertures 18 in which vent plugs are mounted to release gas pressure build-up within the battery during its operation.

The lead and lead-oxide plates are separated and interconnected in known manner, and ultimately terminate in a negative electrode post and a positive electrode post. In accordance with the present invention, a pair of terminal assemblies 30 are embedded in the cover 16.

Figure 3:
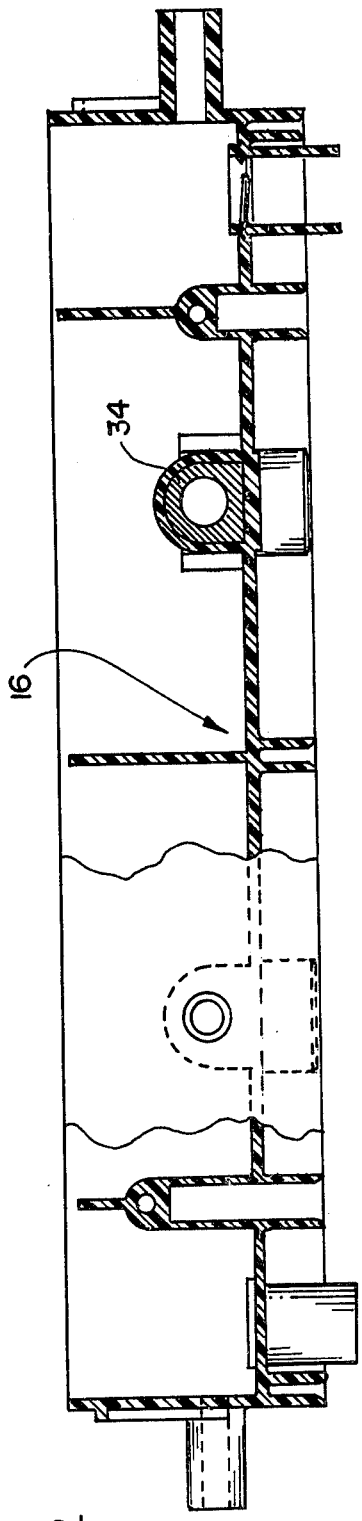
FIG. 3 is a sectional view taken essentially along the line 3—3 of FIG. 2.
Figure 4:
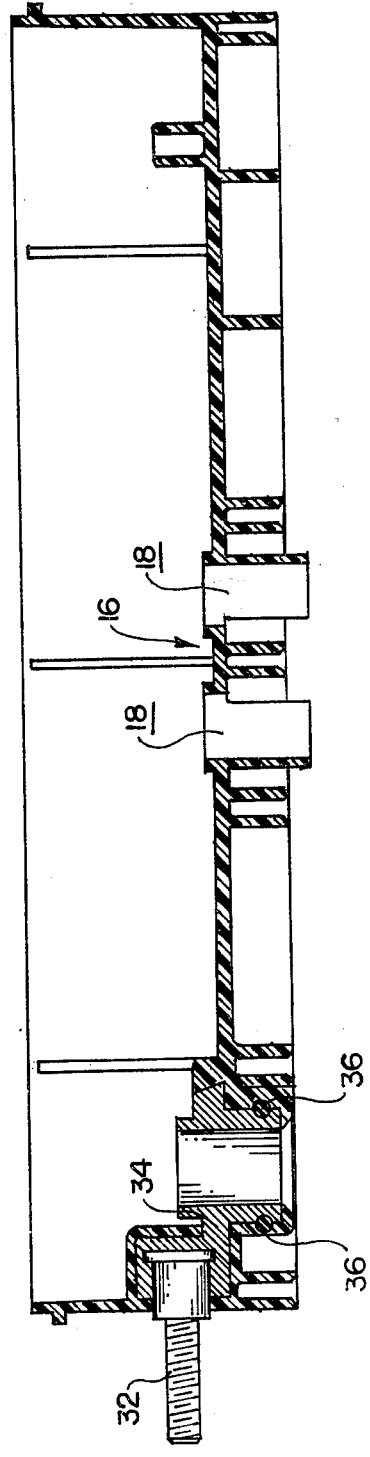
FIG. 4 is a sectional view taken essentially along the line 4—4 of FIG. 2.
Figure 7:
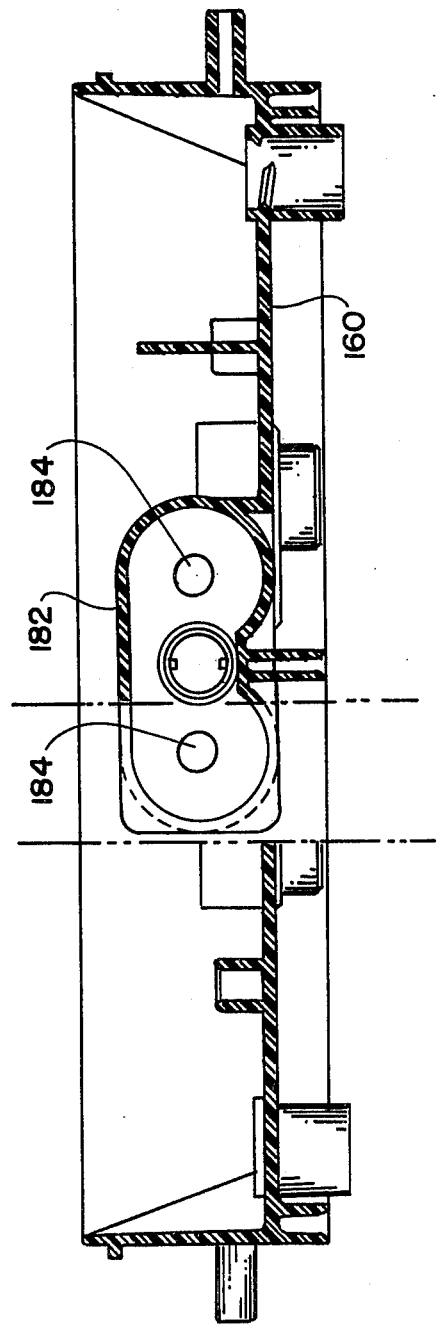
FIGS. 7–11 are different sectional views taken along corresponding numbered lines in FIG. 6.
Figure 8:
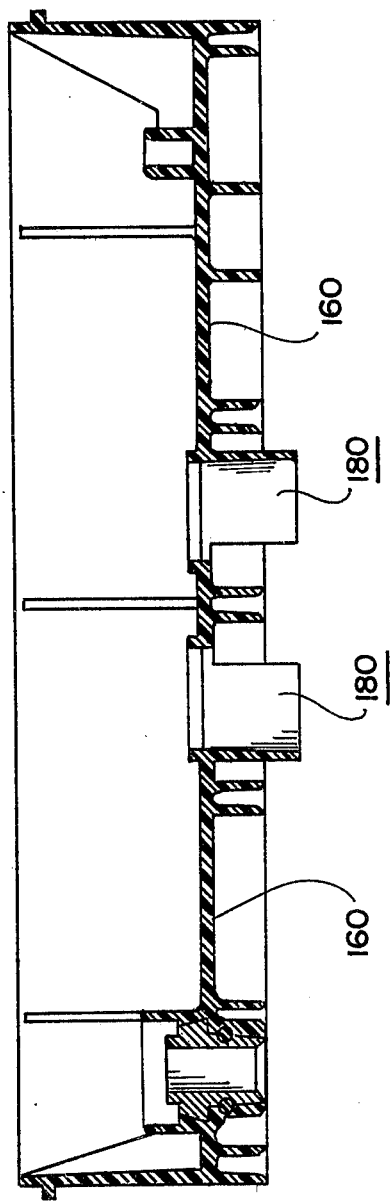

Each terminal assembly include an elongated threaded terminal post 32, as best shown in FIGS. 4 and 5, which is formed of any appropriate electrically conductive metal, and which is embedded in and connected to a plug 34, formed of lead, or other appropriate electrically conductive non-corrosive material. The plug 34, in turn is embedded in the plastic cover 16, as best shown in FIGS. 3, 4 and 5. The terminal post 32 extends in a horizontal position in FIG. 4, and plug 34, as best shown in FIGS. 4 and 5, receives the head of terminal post 32. Plug 34 also has a tubular portion on a vertical axis, and this portion receives the corresponding electrode post 33 (FIG. 5) within the battery casing, when the cover is in place.

It will be appreciated that a first terminal assembly 30 is provided for the positive electrode post, and a second terminal assembly 30 is provided for the negative electrode post. When the cover is in place, the plugs 34 are welded to the corresponding electrode posts 33.

An O-ring 36 surrounds the tubular portion of the plugs 34 to prevent seepage of the electrolyte, as described and claimed in Copending Application Ser. No. 433,787, filed in the name of Ronald J. Hollett and assigned to the present Assignee.

A receptacle housing 40 fits over terminal posts 32. A pair of screws 42 secure housing 40 to the side of cover 16. A pair of terminal pins 45 are threaded over posts 32. The receptacle assembly permits an appropriate connector to be plugged into the battery.

In the construction described above, the battery terminals are completely embedded in the plastic cover, so as to preclude any necessity for potting the terminals with appropriate resin, as is the practice in the usual prior art construction.

In the first embodiment of FIGS. 1–5, and as particularly shown in FIG. 1, the receptacle housing 40 is separate from the cover, and is attached to the cover by screws 42. The receptacle housing 40 and its terminal pins 45 constitute a first type of receptacle in common use today. In the embodiment of FIGS. 6–11, a second type of receptacle known as the "Elcon" type is molded directly into the cover.

The cover in FIG. 6 is designated 160, and like the cover 16 of FIG. 2, it is formed of molded plastic material such as polyethylene. The cover 160, like cover 16, has a number of apertures 180 in which vent plugs are mounted to release gas pressure build-up within the battery during its operation.

In the second embodiment a receptacle 182 is directly molded into the cover, the receptacle being of the Elcon type referred to above.

Figure 9:
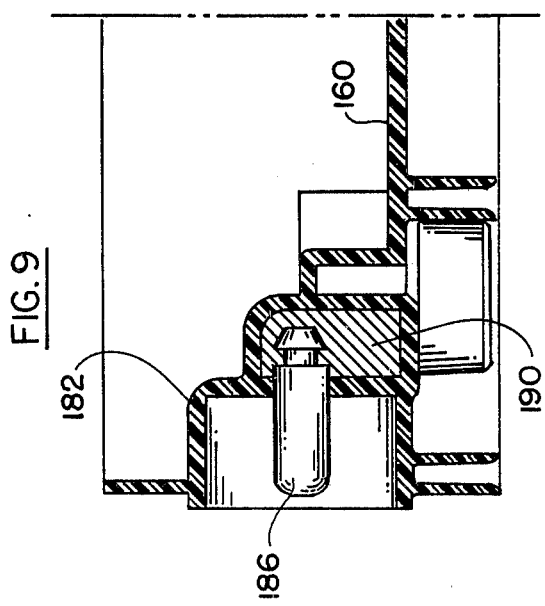
Figure 10:
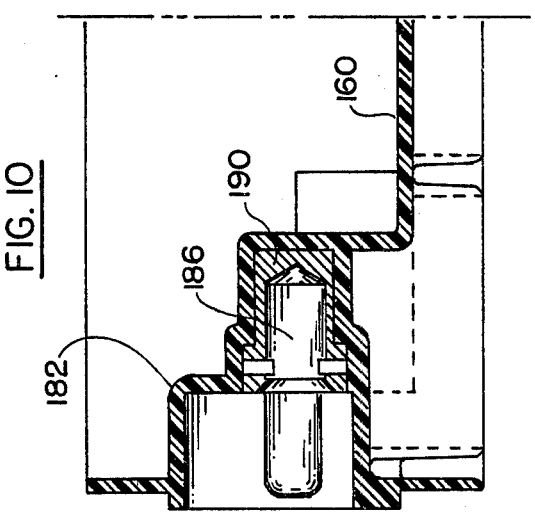

The receptacle 182 includes a pair of spaced holes 184, and terminal pins such as the terminal pins 186 of FIGS. 9 and 10 extend through the holes to be connected to the corresponding positive and negative terminal posts within the battery.

Figure 11:
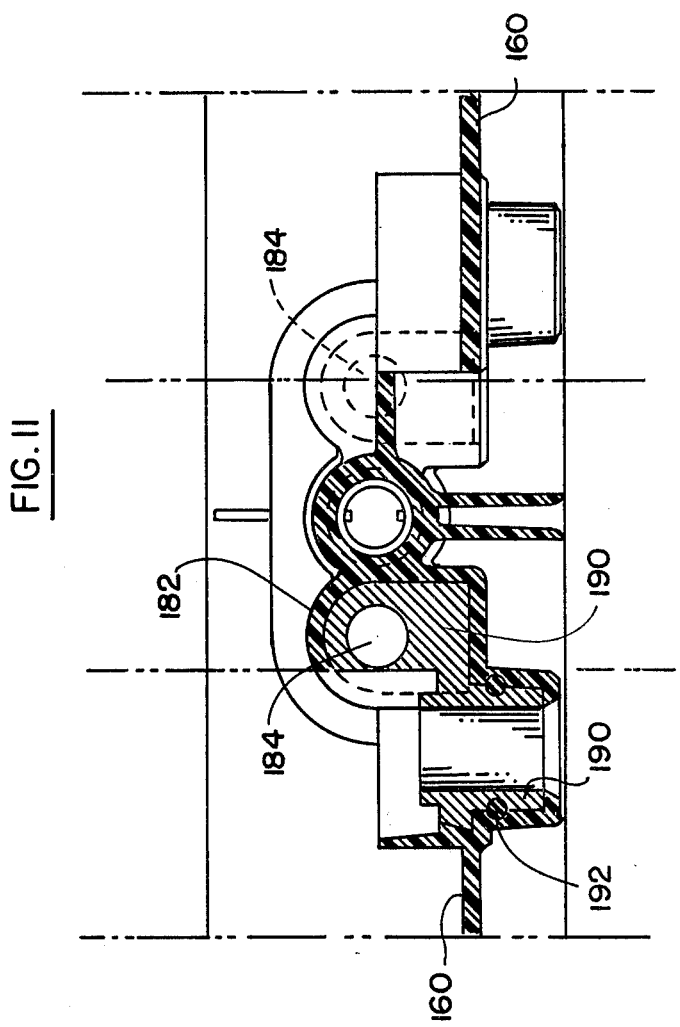

Each of the terminal pins 186 is embedded in and connected to corresponding plugs, such as plugs 190, formed of lead, or other appropriate electrically conductive non-corrosive material. Each plug 190, in turn, is embedded in the receptacle housing 182 of the plastic cover 160, the receptacle housing 182 actually being integral with the plastic cover 160. As best shown in FIGS. 9 and 10, each terminal pin 186 extends in a horizontal position into the corresponding lead plug 190. As shown in FIG. 11 the plug 190 also has a tubular portion disposed on a verical axis which receives the corresponding electrode post within the battery casing when the cover is in place.

A O-ring 192 surrounds the tubular portion of each plug 190 to prevent the seepage of electrolyte as described and claimed in the Copending Application Ser. No. 433,787 referred to above.

In the second embodiment, not only the battery terminals, but the receptacle assembly itself, are completely embedded in the plastic cover, so as to preclude any necessity for separately attaching the terminal assembly to the cover, or for potting the terminals with appropriate resin.

The construction of the present invention has been found to be a significant improvement over the prior art, insofar as assuring that the acid electrolyte within the battery will not seep through the terminal portions and corrode the metal terminals. The assembly also constitutes a significant simplification of the multi-component terminal and receptacle assemblies used in the prior art aircraft batteries of the general type with which the present invention is concerned.

As described above, the construction of this invention in both embodiments, in which the terminals are embedded in the plastic cover, obviates any need for dams or potting compounds, such as are used in the prior art batteries, and totally isolates and insulates the terminals from one another, so that there is no tendency for short circuiting between the terminals, which is prevelent in the prior art batteries.

It will be appreciated that while a particular embodiment of the invention has been shown and described, modifications may be made. The following claims are intended to cover all such modifications which come within the true spirit and scope of the invention.

What is claimed is:

1. A lead-acid storage battery including a casing formed of a plastic material for containing lead and lead-oxide plates, positive and negative electrode posts connected to the plates, and said storage battery containing an acid electrolyte; a cover for the casing formed of plastic material; and a pair of terminal assemblies for the battery embedded in spaced and insulated relationship in the cover, each of the terminal assemblies comprising: a plug embedded in the cover, said plug being formed of electrically conductive material substantially impervious to corrosive attack by the acid electrolyte, and said plug having an embedded first portion positioned adjacent to a side of the cover, an elongated terminal of a predetermined electrically conductive material subject to corrosive attack by the acid electrolyte, said elongated terminal extending through said side of said cover and having a head portion received in said first portion of said plug and completely embedded in said first portion of said plug and said elongated terminal protruding outwardly through said side of said cover from the plug, said elongated terminal being protected by the cover and by the plug against corrosive attack by the acid electrolyte contained within the battery, and the plug having a tubular portion for receiving the corresponding electrode post within the casing when the cover is in place, the axis of said tubular portion being disposed at right angles to the axis of said elongated terminal.

2. The lead-acid storage battery defined in claim 1, in which the plug is composed of lead.

3. The lead-acid storage battery defined in claim 1, and which includes at least one resilient seal extending around said tubular portion of said plug to exert a compressive force on the tubular portion.

4. The lead-acid storage battery defined in claim 3, in which said seal is an O-ring composed of acid resistant resilient material.

5. The lead-acid storage battery defined in claim 1, in which the elongated terminals of said terminal assemblies comprise a pair of threaded terminal posts protruding from the side of the cover in spaced parallel and insulated relationship, and which includes a receptacle housing attached to said cover, and a pair of terminal pins respectively threaded to the threaded terminal posts in coaxial relationship therewith.

6. The lead-acid storage battery defined in claim 1, in which said terminal assemblies include a receptacle housing formed integral with the cover encompassing the elongated terminals, and in which the elongated terminals are contained within the receptacle housing in spaced parallel insulated relationship to constitute terminal pins.

* * * * *